Aug. 11, 1959 T. T. MAGEL 2,899,297
METHOD OF PRODUCING DENSE CONSOLIDATED METALLIC REGULUS
Filed April 19, 1949 2 Sheets-Sheet 2

WITNESSES:

INVENTOR:
Theodore T. Magel
BY

United States Patent Office 2,899,297
Patented Aug. 11, 1959

2,899,297

METHOD OF PRODUCING DENSE CONSOLIDATED METALLIC REGULUS

Theodore T. Magel, Cambridge, Mass., assignor to the United States of America as represented by the United States Atomic Energy Commission Application April 19, 1949, Serial No. 88,373

14 Claims. (Cl. 75—84.1)

This invention relates to a method and apparatus for centrifugally casting metallic specimens. More particularly, it relates to a method and apparatus for reducing dense metal compositions while simultaneously separating impurities from the reduced dense metal and casting said reduced, purified dense metal into well consolidated metal ingots.

In the past, metallic specimens have been readily obtained from the common ore-bearing materials by refining methods of long commercial usage. These methods are quite acceptable when large quantities of the raw material are available for processing, when an extremely high yield is not desired, and when the finished metallic specimen is not required to be completely homogeneous.

However, in certain specific cases as, for example, the use of fissile materials in neutronic reactors, neutron multiplying systems and other nuclear equipment, it is not only desirable but essential that the metallic specimen of fissionable material be completely free of all impurities and in a compacted, purified state. Under normal laboratory conditions a sample may be repeatedly refined and concentrated so that a very pure end product is obtained, but with the disadvantage of a resulting loss of the yield. These conditions are further complicated by the fact that relatively limited amounts of the raw ore-bearing materials are available and thus do not lend themselves readily to a mass purification scheme. Furthermore, while it is relatively easy to prepare the finely divided metal by a reducing action of alkali metals or alkaline earth metals on the metal halides, it is very difficult to prepare the reduced metal in the form of a purified, well consolidated regulus by any method heretofore known.

It is therefore, an object of this invention to provide a rapid, efficient method for preparing substantially pure metal from a compound of a dense metal.

It is another object of this invention to provide a rapid, efficient method for preparing substantially a pure metal from a dense metal halide.

It is another object of this invention to provide a method for reducing a dense, radioactive metal halide to the homogeneous metallic state and simultaneously casting the reduced metal into a consolidated button while separating impurities from the metal.

It is also an object of this invention to provide an apparatus for reducing small quantities of a metallic salt to the substantially pure metallic state.

It is a further object of this invention to provide an apparatus for simultaneously reducing a dense metallic composition to the substantially pure metallic state, separating the pure metal from impurities, and forming said pure metal into a well consolidated regulus.

It is still a further object of this invention to provide an apparatus for reducing a dense radioactive metal halide to the homogeneous metallic state and simultaneously casting the reduced metal into a well consolidated ingot while separating impurities from the reduced metal.

Still further objects will become apparent to those skilled in the art from the description and example which follow.

In accordance with the objects of the present invention it has been found that a salt of a dense metal such as a halide of the dense metal may be reduced to the pure metallic state by the method and apparatus of this invention.

It is to be pointed out that the expression "dense metal" as used in this specification may be defined as a metal having a density greater than 6.0 grams per cubic centimeter. Examples of such dense metals are manganese, zirconium, lanthanum, neodymium, hafnium, thorium, uranium, plutonium, americium, curium, and the like.

The reduction is accomplished by heating the dense metallic salt in the presence of a reducing agent, such as an alkali metal or alkaline earth metal in a bomb-type reacting chamber, while applying centrifugal force on the reacting materials. Separation of the metal from impurities is accomplished essentially by the incorporation of a constricted passageway at the vertex of a conical reacting chamber which is in direct communication with a collecting chamber. When a centrifugal force is applied to the molten metal and slag from the reduction in a direction collinear with the axis of the constricted passage, the dense molten metal is forced therethrough while the less dense slag is retained within the reacting chamber, resulting in a simultaneous separation of the reduced molten metal from the slag and a compacting of said reduced metal into a homogeneous mass.

Before further disclosing the nature and advantages of this invention, reference should be made to the attached drawings hereby made a part of this specification. In the drawings like parts are identified by the same reference numbers.

Figure 1:
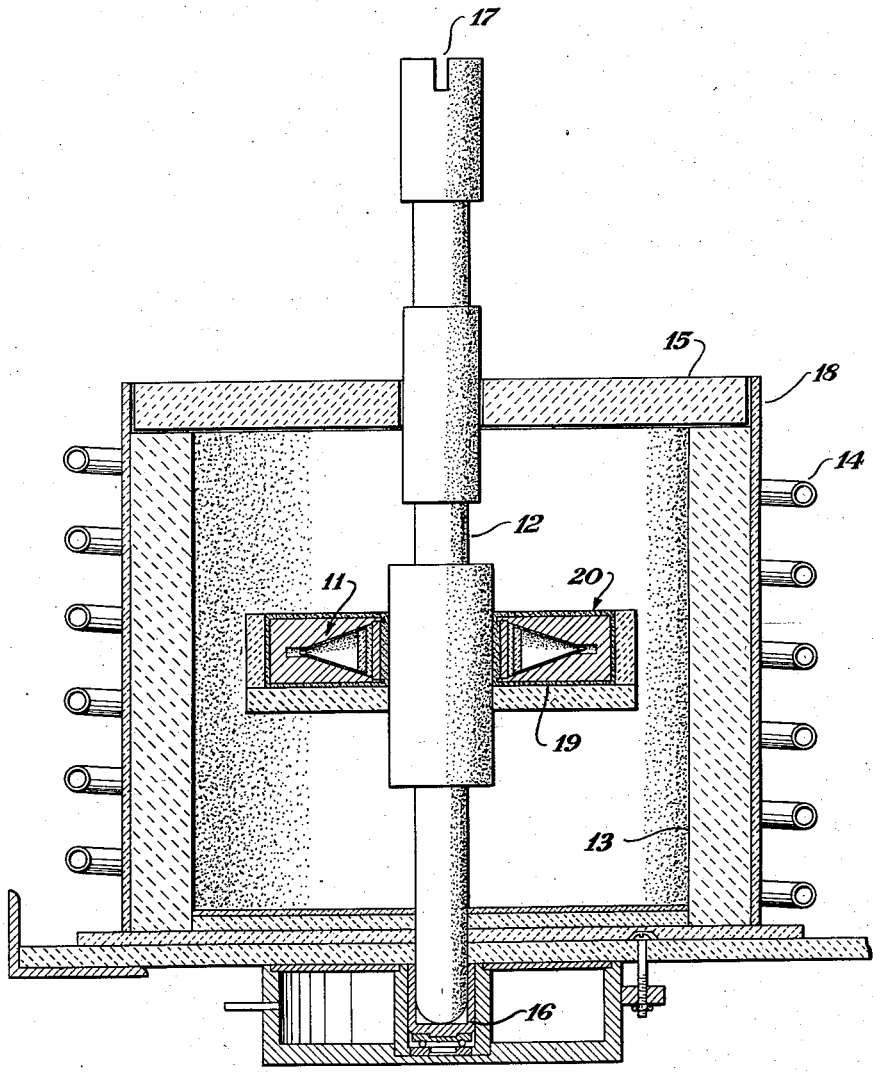
Figure 1 is a sectional view in elevation of the centrifugal purification and casting apparatus, and the induction furnace.

With reference to Figure 1, there is shown a graphite rotor assembly 20, supported by graphite shaft 12, and maintained in the proper alignment by means of water cooled bearing 16. Rotor 20 is positioned centrally in the refractory heating chamber 13 and is heated by inductive heating means 14 placed adjacent to asbestos insulation 18 surrounding the exterior of said chamber 13. A two-piece refractory lid 15, through which passes the upper portion of shaft 12, covers and aids the retention of heat within the container 13. Not shown is a conventional means for introducing rotational motion into rotor 20 through connecting slot 17 in shaft 12.

A plurality of rectangular recesses are constructed in diametrically opposing pairs into the upper face of rotor 20 to hold the steel bombs 11. The recesses have the form of rectangular parallelpipeds with five sides bounded by faces of the rotor material and the sixth open. The long axes of the recesses are perpendicular to the axis of rotation of the rotor 20. The steel reaction bombs 11 are placed in the recesses in such a manner that the apices of the crucibles extend radially outward from the axis of rotation of shaft 12. The bomb 11 is held in operating position by tamping a powdered refractory material 19 such as magnesium oxide into the space between the rotor 20 and bomb 11 so that the steel bomb 11 does not contact any portion of the graphite rotor 20. This arrangement effectively prevents the reduction of the steel by the graphite at high temperatures.

Figure 2:
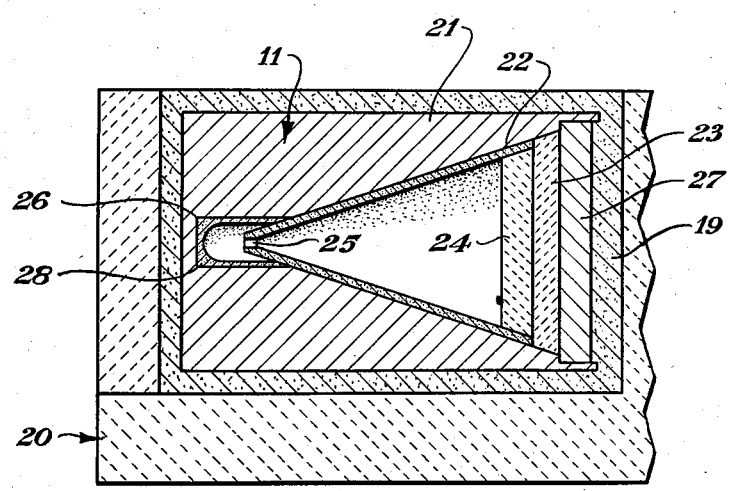
Figure 2 is an enlarged sectional view in elevation of the steel reaction bomb containing the cone-shaped reaction crucible and shows the constricted portion which communicates with the collection chamber for the reduced metal.

In Figure 2 is shown an uncharged reaction bomb in place in the recess of rotor 20. The outer case 21 of the bomb is machined from cylindrical solid steel stock to hold the cone-shaped beryllium oxide liner 22 into which the charge and reducing agent are placed. A cylindrical collection chamber 26, into which is fitted a cup-shaped refractory liner 28 of beryllium oxide, extends outwardly from the cone-shaped refractory liner 22 and communicates with it by means of a constricted passageway 25 at the apex of said cone-shaped refractory liner 22. A beveled, circular beryllium oxide plug 24 is inserted into the liner 22 and is covered by an additional refractory cap 23. The steel bomb cover 27 completes the assembly and is seated upon the refractory cap 23 and welded to the open end of the outer case 21. The entire assembly is then placed in a recess of the graphite rotor 20 and surrounded by firmly tamped refractory oxide 19.

In the preferred practice of this invention the metallic salt to be reduced to the metal is one comprising a halide of a rare refractory metal consisting of zirconium, hafnium, thorium, uranium, plutonium, americium, curium and the like, and preferably the halide is one comprising a chloride of the aforementioned metals. This method is particularly applicable to the preparation of one-gram quantities of the said dense metals although it is to be understood that no restriction is intended to be placed on the order of the size of preparation and purification of the metallic specimen. Somewhat larger and smaller samples have been successfully prepared by this method.

A description of the loading and assembly of the bomb is hereby presented for the purpose of illustrating the facility of operation of the machine and process.

A reducing agent and a halide of the metal to be reduced are placed in the conical reaction chamber defined by the refractory liner 22. The halide is above and covering the reducing agent, with care being exercised that the two components are not mixed nor disturbed in any manner until processing is begun. The beryllium oxide plug 24 is inserted in the opening of liner 22, the refractory cap 23 is placed in position and the assembly is inserted into the machined steel outer case 21 of the bomb. The circular refractory spacer of beryllium oxide 23 is interposed between the crucible assembly and the steel bomb cover 25 prior to welding said steel cover to the bomb, and serves to protect the crucible and its contents from the uneven, heterogeneous heat from the following welding operation, and reduces the probability of a premature and incomplete reaction. The steel bomb cover 27 is attached to the case 21 by welding or any well known means to obtain a gas tight seal.

The sealed bomb is then placed in the recess of the rotor 20 in such a manner that the sealed end is nearest the shaft 12 while the vertex of the conical liner within the bomb extends toward the rim of the rotor. A refractory material such as powdered magnesium oxide is used as a packing material 19 surrounding the sealed bomb in the recess to prevent attack on the steel case at high temperatures by the graphite.

While it is desirable that a multiplicity of specimens be processed simultaneously, a single sample may be centrifuged provided a counterweight such as a dummy bomb or the like is employed in the opposite recess. It can also be seen that while a rotor with two recesses may be used, it is advantageous to employ a rotor having four recesses, as such a rotor permits the processing of a single sample, or, by use of the appropriate counterweights, any one of two, three or four samples.

Forming consolidated metal buttons by this method from a salt of a rare refractory metal is very desirable in that the contamination of the metal by the slag formed during the reduction operation is substantially eliminated. This is accomplished primarily by the incorporation of a constricted passageway at the vertex of the reaction chamber and in communication with the cup-shaped receptacle for collecting the metallic specimen. The diameter of the constricted portion is of such a size that the centrifugal force produced by the rotation of the rotor assembly at the desired speed is sufficient to effect the flow of the molten high density metal through said constricted portion, but is insufficient to permit material flow of the low density slag, thus efficaciously producing a homogeneous, consolidated metallic specimen. An aperture having a diameter of from 0.3 to 1.5 millimeters is satisfactory, while the preferred embodiment of the invention utilizes an aperture of about 0.5 millimeter.

The proportions of the reactants will, of necessity, depend on the nature of the materials used and the size of the apparatus. Normally in the practice of this invention samples in the quantity of about 1 gram are processed.

A specific example relative to the invention is hereby given in detail, but it is to be understood that this example is not intended to be limiting on the spirit or scope of the invention.

*Example*

In a conical reaction chamber defined by a beryllium oxide liner provided with a constricting passageway about 0.5 millimeter in diameter at the vertex conjoining an enlarged receiver are placed about 0.3 gram of calcium and about 1.5 grams of uranium trichloride in the order stated. The crucible is covered with a lid of magnesium oxide and an additional lid of beryllium oxide. The refractory liner containing the charge is then placed inside a steel bomb which is sealed by welding a steel cap to the open end. The bomb and its contents are then placed in a recess in the graphite rotor so that the vertex of the bomb extends radially outward from the shaft of the rotor. The bomb is packed securely in the recess of the graphite rotor with magnesium oxide, a duplicate or dummy bomb is likewise packed in the opposite recess to maintain the balance of the rotor, and the entire rotor assembly is then placed in position within a high frequency induction furnace. The rotor is heated rapidly to 1400° C. by induction from a 50 kilowatt, 3000 cycle, 400 volt generator while rotating at a rate of speed sufficient to develop a force in the bomb of about fifty times that of gravity. A speed of 900 revolutions per minute on a six inch rotor is sufficient to produce the necessary force. Heat is maintained for a period of time sufficient to effect complete reduction of the uranium trichloride to the metallic state, usually about two minutes. As reduction proceeds within the crucible, the dense, molten metal is thrown by centrifugal force toward the tip of the refractory conical liner, and passes through the constricted passageway into the cylindrical collection chamber where it accumulates in the form of a dense, metallic specimen, substantially free of slag and other impurities. The lighter, less dense slag is confined to the reaction crucible and is thus essentially separated from the desired metallic specimen. Rotation of the rotor assembly is continued after the heating operation until the temperature is reduced to about 450° C., at which time the rotor is stopped and the bomb may be opened to obtain the dense metal specimen as a bright, coherent regulus.

While only one example has been given, it should be pointed out that other reactants may be employed in the method of this invention. For example, lithium satisfactorily reduces plutonium fluoride in a minimum of about three minutes at 1100° C., e.g., 0.15 gram of lithium per 1.5 grams of plutonium tetrafluoride. Double salts of the dense metals are easily subjected to reduction by the method of this invention. For example, anhydrous potassium thorium fluoride ($K_2ThF_6$) may be reduced with metallic sodium to obtain thorium in the form of a coherent metal regulus, e.g., 0.15 gram of sodium per 1.0 gram of potassium thorium fluoride at 1250° C. for at least two minutes.

Other reductants may be employed to reduce dense metal halides by the method of this invention. Any metal having an oxidation-reduction potential substantially more negative than that of the material to be reduced may be used. All of the alkali metals and practically all of the alkaline earth metals will effectively reduce halides of the dense metals hereinbefore described, and combinations of such reducing agents may also be employed in various proportions to obtain the metal in the desired elemental state.

From the foregoing example and embodiments thereof, it will be seen that the apparatus and method of this invention offers numerous advantages in the preparation of small, coherent metallic specimens from dense metallic salts. The metallic product is essentially purified from the slag and other end products of the reaction, and is very effectively separated from said slag by the method of this invention. The density and malleability of the reduced specimen is therefore increased to desirable optimums.

Another advantage is the relatively short period of time required to effect the integrated steps of reducing the halide to the metal and collecting the reduced metal in the form of a purified, coherent metal regulus. A normal operation, including loading the crucibles, welding of the top to the bomb, reduction and cooling, requires about one hour. At the end of this time period, the metallic specimen is ready for removal from the collecting chamber and after superficial cleaning may be put to immediate use.

A further advantage of this method is the increase in the coherence of the metallic button, a substantial improvement over the other methods previously known.

Many embodiments of the invention are, of course, possible. The refractory crucible need not be of beryllium oxide, but may be of any refractory oxide which will withstand the temperatures used and will not contaminate the melt. For example, crucibles of aluminum oxide, calcium oxide or magnesium oxide may be used. While the preferred embodiment of the invention makes use of a conical reaction crucible, a hemispherical, pyramidal, or a like form may be satisfactorily employed.

The use of a lid of a fusible salt such as sodium chloride placed directly over the charge in the reaction crucible aids in preventing any metal from sticking to the magnesium oxide lid, which often happens in the reduction of plutonium trichloride. The lid of sodium chloride melts as the temperature of the bomb increases to about 800° C. and any metal which may be thrown up to the lid falls back into the crucible and is combined with the major portion of the metal.

Halides which are not subject to splattering may be processed without the use of the fusible salt lid.

Methods for closing the steel bomb other than welding may be used. For example, a threaded screw plug arrangement may be employed when it is desirable to re-use the bombs.

Since it is thus seen that many embodiments of this invention are possible, it is to be understood that the invention is not to be limited except as indicated in the appended claims.

What is claimed is:

1. A method for obtaining a dense consolidated metallic regulus from a dense metal composition, which comprises providing at least two communicating zones, a first zone for reducing the metal composition and a second zone for collecting reduced metal, a portion of the communication between said zones being constricted to provide resistance to the flow of low density materials but not sufficiently constricted to prevent the flow of the high density molten metal product, heating the dense metal composition and reductant in said first zone to a temperature substantially above the melting point of the dense metal composition, and applying centrifugal force to said molten composition along an axis from the reaction zone through the constricted communication to the collecting zone so as to collect only dense metal product in the latter zone.

2. A method of obtaining a dense, consolidated metallic regulus from a dense metal composition, which comprises heating in a reacting zone a dense metal composition and a reducing agent to a temperature substantially above the melting point of the higher melting reactant for a period of time sufficient to effect reduction of the dense metal composition, applying centrifugal force to said reactants, said force being applied in a direction along an axis from the reacting zone through a constricted communication to a collecting zone, cooling the reduced metal, continuing the application of said force while the reduced metal is cooling in the collecting zone and until said reduced metal is consolidated into a homogeneous, coherent metal regulus in the latter zone.

3. A method of obtaining a dense, consolidated uranium regulus from a uranium salt, which comprises heating in a reacting zone a uranium salt and a reducing agent to a temperature substantially above the melting point of the higher melting reactant for a period of time sufficient to effect reduction of the uranium salt, applying centrifugal force to said reactants, said force being applied in a direction along an axis from the reacting zone through a constricted communication to a collecting zone, cooling the uranium metal, continuing the application of said force while the uranium metal is cooling in the collecting zone and until said reduced metal is consolidated into a homogeneous, coherent uranium metal regulus in the latter zone.

4. A method of obtaining a dense, consolidated uranium regulus from a uranium halide, which comprises heating in a reacting zone a uranium halide and an alkaline earth metal to a temperature substantially above the melting point of the higher melting reactant for a period of time sufficient to effect reduction of the uranium halide, applying centrifugal force to said reactants, said force being applied in a direction along an axis from the reacting zone through a constricted communication to a collecting zone, cooling the uranium metal, continuing the application of said force while the uranium metal is cooling in the collecting zone and until said reduced metal is consolidated into a homogeneous, coherent uranium metal regulus in the latter zone.

5. A method of obtaining a dense, consolidated uranium regulus from a uranium chloride, which comprises heating in a reacting zone a uranium chloride and calcium metal to a temperature substantially above the melting point of the calcium metal for a period of time sufficient to effect reduction of the uranium chloride, applying centrifugal force to said reactants, said force being applied in a direction along an axis from the reacting zone through a constricted communication to a collecting zone, cooling the uranium metal, continuing the application of said force while the uranium metal is cooling in the collecting zone and until said reduced metal is consolidated into a homogeneous, coherent uranium metal regulus in the latter zone.

6. A method for obtaining a dense, consolidated uranium regulus from uranium trichloride which comprises heating in a reacting zone 1.5 grams of uranium trichloride and 0.3 gram calcium metal to a temperature of 1400° C. for at least two minutes, applying centrifugal force to the reactants, said force being applied in a direction along an axis from the reacting zone through a constricted communication to a collecting zone, cooling the reduced uranium metal, continuing the application of said force while the uranium metal is cooling in the collecting zone and until said uranium metal is consolidated into a homogeneous, coherent uranium metal regulus in the latter zone.

7. A method of obtaining a dense, consolidated thorium regulus from a thorium salt, which comprises heating in a reacting zone a thorium salt and a reducing agent to a temperature substantially above the melting point of the higher melting reactant for a period of time sufficient to effect reduction of the thorium salt, applying centrifugal force to said reactants, said force being applied in a direction along an axis from the reacting zone through a constricted communication to a collecting zone, cooling the thorium metal, continuing the application of said force while the thorium metal is cooling in the collecting zone and until said reduced metal is consolidated into a homogeneous, coherent thorium metal regulus in the latter zone.

8. A method of obtaining a dense, consolidated thorium regulus from a thorium double salt, which comprises heating in a reacting zone a thorium double salt and an alkali metal to a temperature substantially above the melting point of the higher melting reactant for a period of time sufficient to effect reduction of the thorium double salt, applying centrifugal force to said reactants, said force being applied in a direction along an axis from the reacting zone through a constricted communication to a collecting zone, cooling the thorium metal, continuing the application of said force while the thorium metal is cooling in the collecting zone and until said reduced metal is consolidated into a homogeneous, coherent thorium metal regulus in the latter zone.

9. A method of obtaining a dense, consolidated thorium regulus from an alkali metal thorium halide, which comprises heating in a reacting zone an alkali metal thorium halide and sodium to a temperature substantially above the melting point of the higher melting reactant for a period of time sufficient to effect reduction of the alkali metal thorium halide, applying centrifugal force to said reactants, said force being applied in a direction along an axis from the reacting zone through a constricted communication to a collecting zone, cooling the thorium metal, continuing the application of said force while the thorium metal is cooling in the collecting zone and until said reduced metal is consolidated into a homogeneous, coherent thorium metal regulus in the latter zone.

10. A method for obtaining a dense, consolidated thorium regulus from potassium thorium fluoride which comprises heating in a reacting zone 1.0 gram of potassium thorium fluoride and 0.15 gram sodium metal to a temperature of 1250° C. for at least two minutes, applying centrifugal force to the reactants, said force being applied in a direction along an axis from the reacting zone through a constricted communication to a collecting zone, cooling the reduced thorium metal, continuing the application of said force while the thorium metal is cooling in the collecting zone and until said thorium metal is consolidated into a homogeneous, coherent thorium metal regulus in the latter zone.

11. A method of obtaining a dense, consolidated plutonium regulus from a plutonium salt, which comprises heating in a reacting zone a plutonium salt and a reducing agent to a temperature substantially above the melting point of the higher melting reactant for a period of time sufficient to effect reduction of the plutonium salt, applying centrifugal force to said reactants, said force being applied in a direction along an axis from the reacting zone through a constricted communication to a collecting zone, cooling the plutonium metal, continuing the application of said force while the plutonium metal is cooling in the collecting zone and until said reduced metal is consolidated into a homogeneous, coherent plutonium metal regulus in the latter zone.

12. A method of obtaining a dense, consolidated plutonium regulus from a plutonium halide, which comprises heating in a reacting zone a plutonium halide and an alkali metal to a temperature substantially above the melting point of the higher melting reactant for a period of time sufficient to effect reduction of the plutonium halide, applying centrifugal force to said reactants, said force being applied in a direction along an axis from the reacting zone through a constricted communication to a collecting zone, cooling the plutonium metal, continuing the application of said force while the plutonium metal is cooling in the collecting zone and until said reduced metal is consolidated into a homogeneous, coherent plutonium metal regulus in the latter zone.

13. A method of obtaining a dense, consolidated plutonium regulus from a plutonium fluoride, which comprises heating in a reacting zone a plutonium fluoride and lithium metal to a temperature substantially above the melting point of the lithium metal for a period of time sufficient to effect reduction of the plutonium fluoride, applying centrifugal force to said reactants, said force being applied in a direction along an axis from the reacting zone through a constricted communication to a collecting zone, cooling the plutonium metal, continuing the application of said force while the plutonium metal is cooling in the collecting zone and until said reduced metal is consolidated into a homogeneous, coherent plutonium metal regulus in the latter zone.

14. A method for obtaining a dense, consolidated plutonium regulus from plutonium tetrafluoride which comprises heating in a reacting zone 1.5 grams of plutonium tetrafluoride and 0.15 gram lithium metal to a temperature of 1100° C. for at least three minutes, applying centrifugal force to the reactants, said force being applied in a direction along an axis from the reacting zone through a constricted communication to a collecting zone, cooling the reduced plutonium metal, continuing the application of said force while the plutonium metal is cooling in the collecting zone and until said plutonium metal is consolidated into a homogeneous, coherent plutonium metal regulus in the latter zone.

References Cited in the file of this patent

UNITED STATES PATENTS

| 964,371 | Bary | July 12, 1910 |
| 1,212,426 | Voigtlander et al. | Jan. 16, 1917 |
| 1,240,460 | Knapp | Sept. 18, 1917 |
| 1,378,189 | Northrup | May 17, 1921 |
| 1,452,480 | Patch | Apr. 17, 1923 |
| 2,107,513 | Swoger | Feb. 8, 1938 |
| 2,161,950 | Christensen | June 13, 1939 |
| 2,255,549 | Kruh | Sept. 9, 1941 |
| 2,378,042 | Sorensen et al. | June 12, 1945 |

OTHER REFERENCES

Goggin et al.: "Metallic Uranium Industrial and Engineering Chemistry," vol. 18, pp. 114–116 (1926).